May 6, 1930.  A. J. DAVIS  1,757,418
MULCHER
Filed Oct. 4, 1928   2 Sheets-Sheet 1
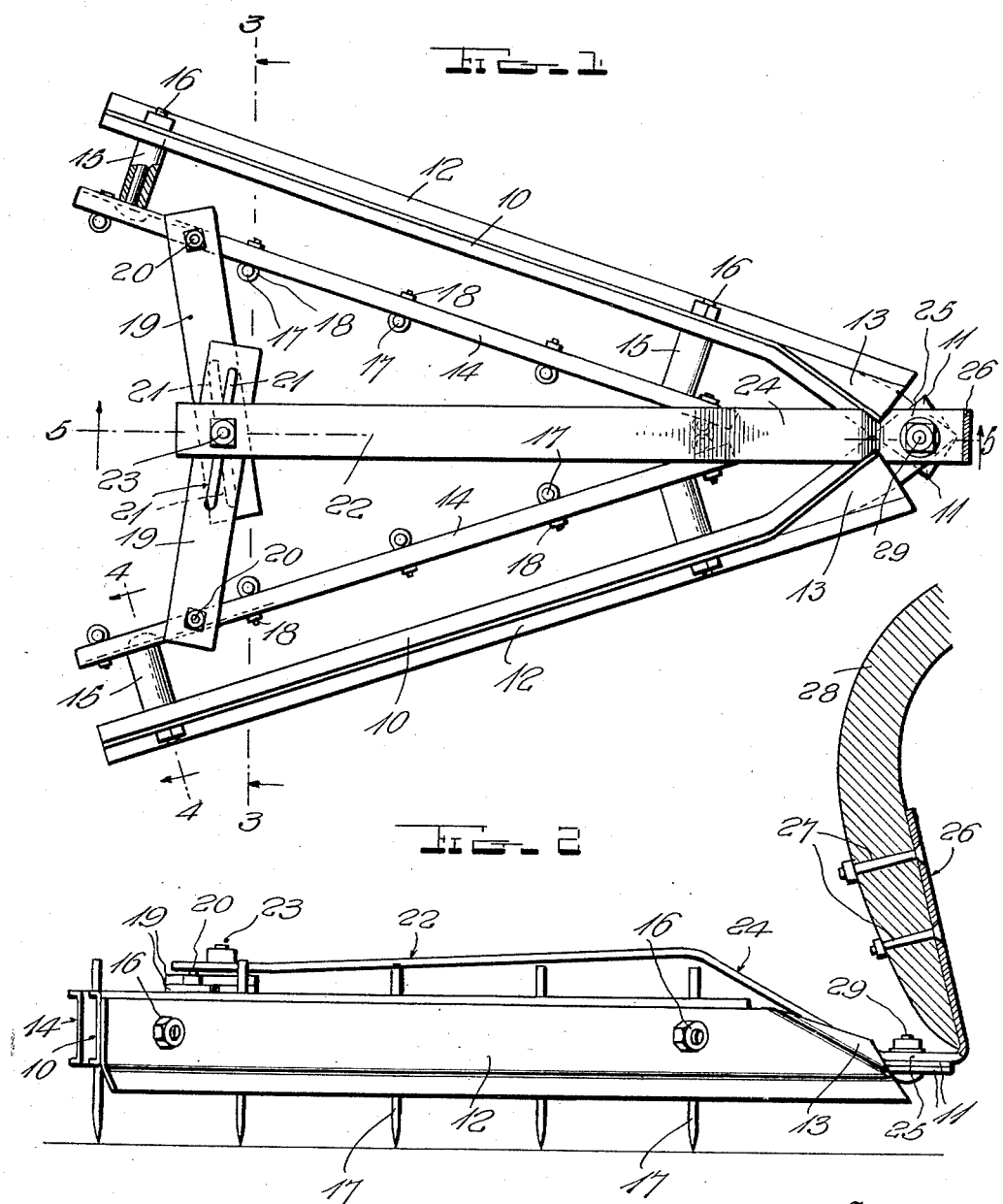
Inventor
A. J. Davis,

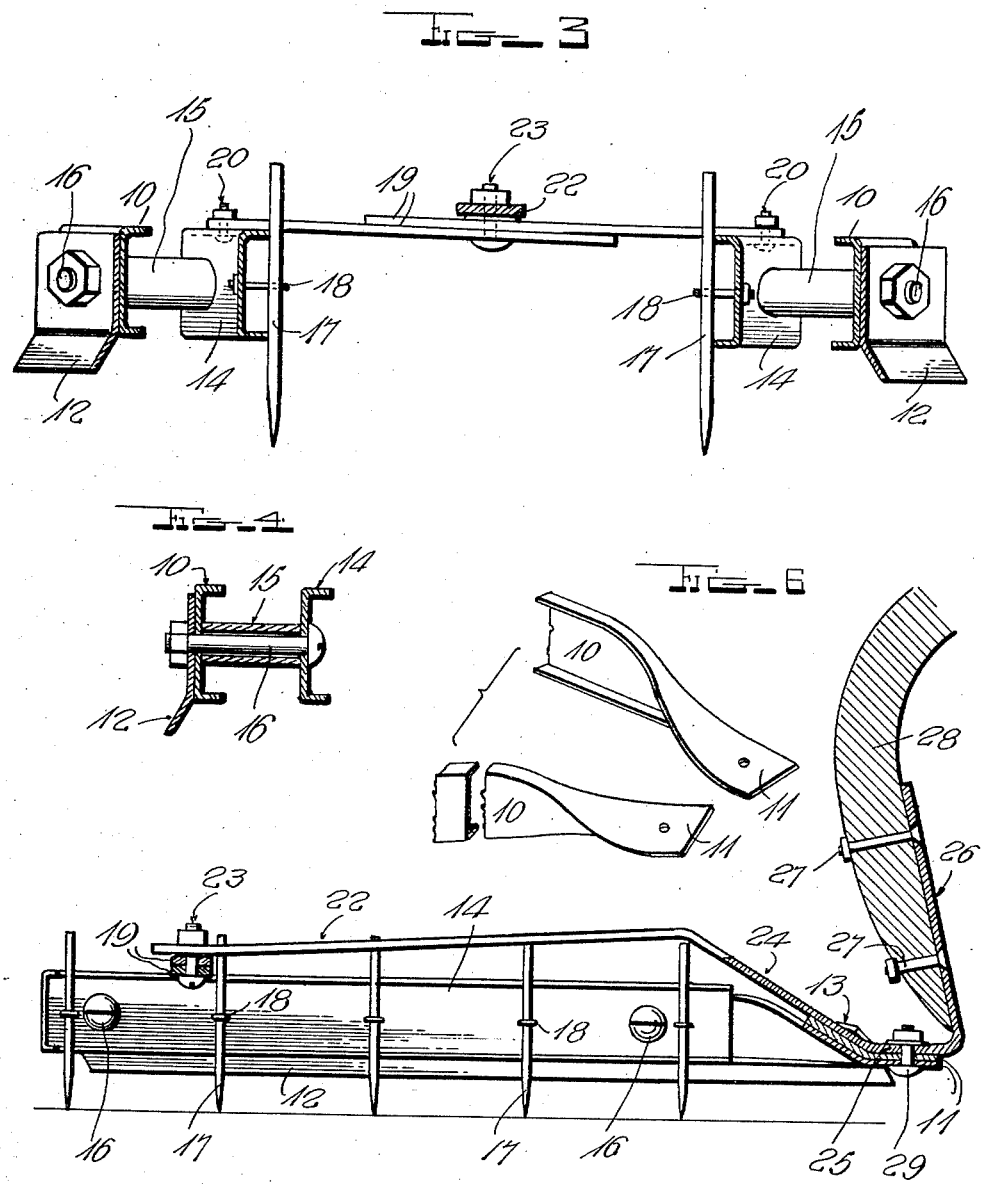

Patented May 6, 1930

1,757,418

UNITED STATES PATENT OFFICE

ARTHUR JAMES DAVIS, OF COMANCHE, OKLAHOMA

MULCHER

Application filed October 4, 1928. Serial No. 310,408.

The invention relates primarily to a construction adapted for use as an attachment for a single row cultivator instead of the usual cultivating blades for the purpose of effectively working and mulching rows of cotton, corn, etc.

It is the object of the invention to provide a mulcher of exceptionally simple and inexpensive, yet efficient and reliable construction which may be adjusted as desired, according to the distance between the rows being worked.

With the foregoing in view, the invention resides in the novel subject matter hereinafter described and claimed, description being accomplished by reference to the accompanying drawings.

Fig. 1 is a top plan view.

Fig. 2 is a side elevation.

Fig. 3 is a vertical transverse section on line 3—3 of Fig 1.

Fig. 4 is a detail vertical transverse sectional view on line 4—4 of Fig. 1.

Fig. 5 is a longitudinal sectional view on line 5—5 of Fig. 1.

Fig. 6 is a fragmentary perspective view of the front ends of the blade-carrying bars.

The drawings above briefly described illustrate the preferred form of construction and while this construction will be herein specifically explained, it is to be understood that within the scope of the invention as claimed, variations may be made.

A pair of outer forwardly converging channel bars 10 are provided, the front ends of these bars being flattened and twisted so that they lie against each other in a horizontal plane as denoted at 11. Two longitudinal earth-scraping blades 12 are secured against the outer sides of the bars 10.

A pair of inner forwardly converging channel bars 14 are spaced inwardly from the bars 10 by spacing sleeves 15, bolts 16 being passed through the bars 10 and 14 and through the scraping blades 12 to secure all of these parts at each side of the mulcher, rigidly together. The inner bars 14 are provided with earth working teeth 17 secured thereto by any desired means such as the eyebolts 18.

Two transverse slidably overlapped links 19 are pivoted at their outer ends to the bars 14 at the rear ends of the latter, the pivots being preferably in the form of bolts 20. The inner ends of these links are provided with longitudinal slots 21. A central longitudinal bar 22 lies against the overlapped links 19 and these links are clamped to the rear end of the bar by a bolt 23 passing through the latter and the slots 21. Loosening of this bolt permits lateral adjustment of the rear end of the mulcher according to the distance between rows being worked.

The front portion of the bar 22 declines forwardly at 24, at 25, immediately in front of portion 24, lies horizontally upon the bar end 11, and then turns upwardly as at 26 for anchorage by means of bolts 27 to a cultivator beam 28 or other desired draft member. The upper front corners 13 of the blades 12 are bent inwardly upon the forwardly declined bar portion 24, providing a construction upon which weeds will not readily catch. A pivot bolt 29 passes through the bar portions 11—25 to permit swinging of the bars 10—14 when the bolt 23 is loosened.

It will be seen from the foregoing that the construction of the mulcher is exceptionally simple and inexpensive, yet that such construction will be rigid and in every way desirable.

When circumstances permit, two of the mulchers suitably attached to the frame of a cultivator in place of the usual cultivator teeth may be drawn directly upon rows to be worked. The teeth 17 then effectively loosen the earth upon and immediately along the rows and the blades 12 scrape the earth between the rows free of small weeds, at the same time loosening it. When the plants in the rows are sufficiently large, the mulchers are drawn between the rows, instead of upon the latter, during which procedure the spaces between the rows are effectively worked by the teeth 17 while the earth along opposite side of said rows, is thrown toward them. I have found that excellent results are obtainable when working cotton and corn in this manner, but it is to be understood that the invention may be used in any desired way.

I claim:—

1. A mulcher comprising two outer forwardly converging bars, a pivot connecting the front ends of said bars, spacers fixed to and projecting inwardly from said outer bars, an inner pair of forwardly converging bars secured solely to the inner ends of said spacers and by the latter held in inwardly spaced relation with said outer bars, scraping blades extending longitudinally of and secured to said outer bars, earth-working teeth secured to said inner bars, a central longitudinal bar connected at its front end with the aforesaid pivot and free of direct connection with said inner bars, and adjustable means connecting the rear end of said central bar with only the rear ends of said inner bars, permitting inward and outward adjustment of said inner and outer bars.

2. A mulcher comprising a pair of outer forwardly converging bars disposed in vertical planes and having their front ends twisted and overlapped with each other in a horizontal plane, inner forwardly converging bars and means securing them in spaced relation with said outer bars, said inner bars being provided with earth-working teeth, transverse tie means extending between the rear ends of certain of said bars, a central longitudinal bar whose rear end is connected with said transverse tie means, the front portion of said central bar being declined forwardly, lying against the uppermost of said overlapped horizontal bar ends immediately in front of the declined bar portions and being then bent upwardly for attachment to a draft device, a vertical bolt connecting said horizontal overlapped bar ends to the overlying portion of said central bar, and scraping blades secured to the outer sides of said outer bars, said blades having upper front corner portions bent inwardly over said horizontal ends of said outer bars and lying upon said forwardly declined portion of said central bar.

In testimony whereof I have hereunto affixed my signature.

ARTHUR JAMES DAVIS.